E. D. CHARTERS.

INCUBATOR.

APPLICATION FILED JUNE 19, 1920.

Reissued Dec. 20, 1921.

15,247.

2 SHEETS—SHEET 1.

Witness

Inventor

Ernest D. Charters

By Harry C. Schroeder

Attorney

E. D. CHARTERS.

INCUBATOR.

APPLICATION FILED JUNE 19, 1920.

Reissued Dec. 20, 1921. 15,247.

2 SHEETS—SHEET 2.

Inventor
Ernest D. Charters

Witness
E. M. Wagner.
Edw. R. Walton Jr.

By Harry C. Schroeder
Attorney

UNITED STATES PATENT OFFICE.

ERNEST D. CHARTERS, OF SANTA CRUZ, CALIFORNIA, ASSIGNOR TO CHARTERS MANUFACTURING CO., OF SANTA CRUZ, CALIFORNIA, A CORPORATION OF CALIFORNIA.

INCUBATOR.

15,247. Specification of Reissued Letters Patent. Reissued Dec. 20, 1921.

Original No. 1,271,666, dated July 9, 1918, Serial No. 116,755, filed August 24, 1916. Application for reissue filed June 19, 1920. Serial No. 390,266.

*To all whom it may concern:*

Be it known that I, ERNEST D. CHARTERS, a citizen of the United States, residing at Santa Cruz, in the county of Santa Cruz and State of California, have invented a new and useful Incubator, of which the following is a specification.

My invention is an improvement in incubators and has for its object to provide a new and improved means for controlling the temperature of the incubator, wherein the supply of heat is controlled by the difference of the outside and the inside temperature, by varying the size of the flame, without the use of dampers or the like.

The invention further provides for totally extinguishing the flame with the exception of a small portion thereof which will serve as a pilot light and having no material heating effect.

To these ends the invention consists in the sundry details of construction, combination and arrangement of parts hereinafter fully described. In this specification and the annexed drawings, the invention is disclosed in the form which is considered to be the best, but the invention is not limited to such form because it is capable of being embodied in other forms; and it is to be understood that in and by the claims following the description herein, it is intended to cover the invention in whatever form it may be embodied within the scope thereof.

Referring particularly to the drawings:—

Figure 1:
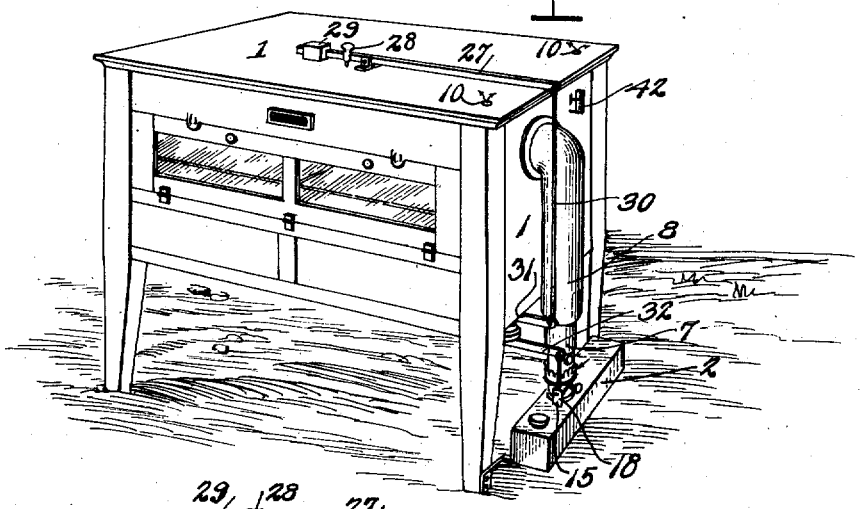
Figure 1 is a perspective view of the improved incubator.
Figure 2:
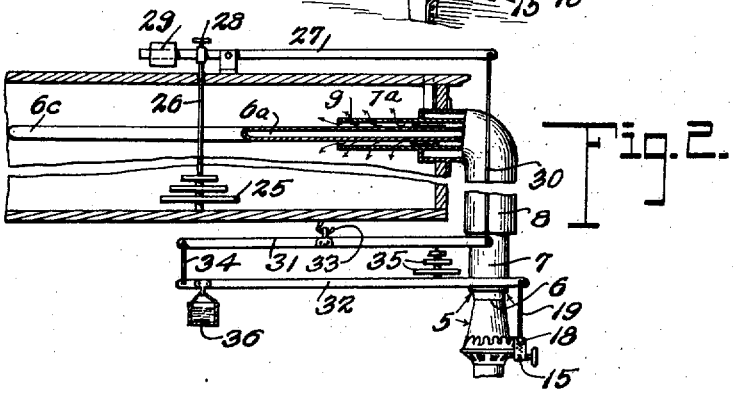
Fig. 2 is a partial longitudinal vertical section.
Figure 3:
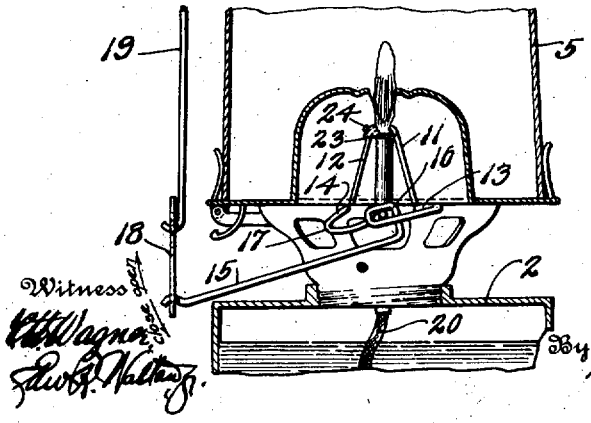
Fig. 3 is an enlarged sectional view through the burner.
Figure 5:
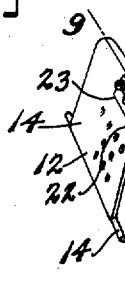
Fig. 5 is a similar view with the shutters closed.

In the present embodiment of the invention, an incubator 1 is provided of the usual form, which is supplied with heat from a lamp 2 having a burner 3, and a wick 4. The lamp is provided with the usual flue or chimney 5 of tapering form, and having its upper or small end engaging the lower end of a heavy iron pipe 6. This pipe 6 extends upwardly alongside the incubator, and a lighter or thinner continuation $6^a$ of the pipe extends through the incubator wall. The pipe 6—$6^a$ is inclosed by a pipe 7—$7^a$ and the pipe 7—$7^a$ is inclosed by a casing 8—$8^a$, the portions 7 and 8 of the pipe 7—$7^a$ and 8—$8^a$ being vertical, while the portions $7^a$—$8^a$ are horizontal, extending into the incubator and inclosing the portion $6^a$ of the pipe 6—$6^a$. The inner end of the portion $7^a$ of the pipe 7—$7^a$ is open and the said pipe is provided with discharge openings 9 adjacent to the said open inner end. The outer end of the pipe 7—$7^a$ is also open, but the ends of the pipe 8—$8^a$ are closed as shown, and the ends of the said pipe stop short of the ends of the pipe 7—$7^a$. The heated air passes upward through the pipe 6—$6^a$ and enters the incubator, passing along the said pipe $6^a$, until the pipe branches into branches $6^b$, and these branches extend toward the opposite end of the incubator casing in diverging relation, and are then bent sharply backward, as shown at $6^c$ in parallel relation toward the first named end of the incubator, where they extend upward opening through the top of the incubator, as indicated at 10, delivering to the atmosphere.

Figure 6:
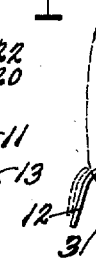
Fig. 6 is a diagrammatic end view of the burner.
Figure 4:
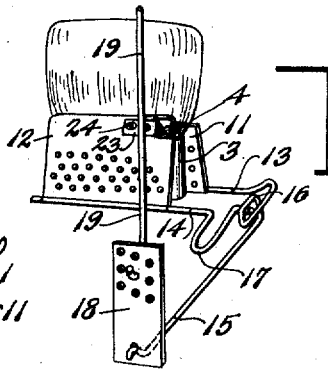
Fig. 4 is a perspective view of the burner with the controlling shutters open.
Figure 7:
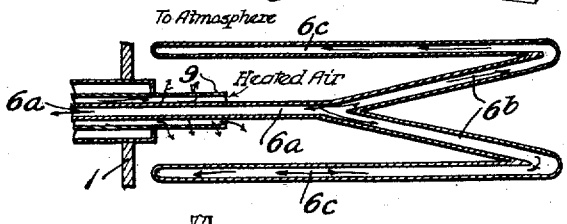
Fig. 7 is a horizontal section through the heating pipes.
Figure 8:
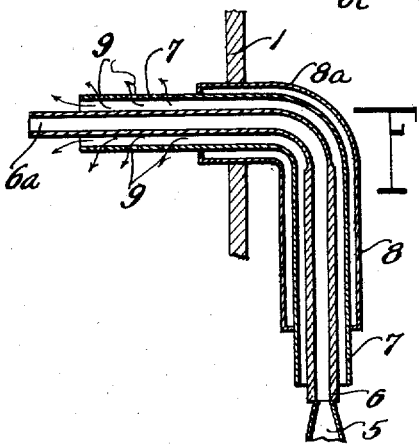
Fig. 8 is a vertical section through the said pipes.
Figure 9:
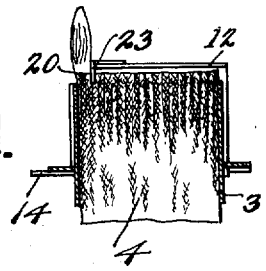
Fig. 9 is a section on the line 9—9 of Fig. 5.

The flame of the wick 4 in the burner 3 is controlled by a pair of shutters 11 and 12 respectively, each of the said shutters being secured at its lower side edge to a shaft 13 and 14 respectively, in such manner that when the shafts are oscillated, the shutters will be simultaneously moved toward and from the flame of the wick, and the upper ends of the said shutters are bent or curved inwardly, as shown, to contact when they are completely closed above the upper end of the wick, cutting off the flame as indicated in Fig. 6. The shafts 13 and 14 are journaled in the casing of the burner, and the shaft 13 is provided with an operating arm 15, having interposed in its length a loop 16, and this loop is engaged by an arm 17 on the shaft 14 in such manner that when the arm 15 is raised, the shutters will be opened, while when the said arm is lowered, the shutters will be closed.

As above stated, when the shutters 11 and 12 are moved toward each other the flame may be diminished or extinguished, and when moved away from each other will permit the size of the flame to increase according to the extent of the movement imparted thereto by the controlling means, to be presently described. It will be noticed that a portion of the upper or distal curved edges of the shutters 11 and 12 is cut away or notched at one of their corners adjacent the wick 4, as indicated at 21 and 22 respectively, so as to always permit a small portion of the flame to remain unextinguished to serve as a pilot light. This pilot light is very small and the heat therefrom will not be sufficient to have a material effect on the thermostatic control means of the incubator. In the embodiment of the invention herein shown, an angle plate 23 is adjustably connected with one of the shutters at its notched portion 22, in such manner that it may be moved longitudinally of the upper edge of the shutter. One of the portions of the angle plate extends perpendicularly and inwardly toward the other shutter so that when the shutters approach each other and finally assume their closed position, this portion of the plate will extend transversely across the top of the wick and act as a wall shutting off the flame of the pilot light from the rest of the wick. The plate 23 has a longitudinally extending slot, and set screws 24 passing through the slot for adjustably connecting the angle plate to the shutter. This permits the angle plate to be adjusted in the cutaway or recess portion 22 of the shutters to vary the size of the flame.

In practice, however, the plate 23 may be eliminated as the flame of the pilot light will not extend along the wick for a distance greater than the cutaway or notched portion in the shutters. Also it may be found desirable to have the pilot light 20 furnished by a small independent wick arranged at one end of the burner 3 and extending into the oil of the lamp, and separately controlled so far as raising and lowering is concerned, by any suitable means.

The operating arm 15 is provided at its outer end with a hook which engages an opening in the lower end of the plate 18, the said plate having at its upper end a series of nine openings, so arranged that the openings are spaced unequal distances from the opening for the arm. A link is provided with a hook for engaging in one of the openings at the top of the plate, and the upper end of the link is connected with the controlling mechanism for controlling the movement of the arm 15 and the shutters.

The temperature controlled mechanism for the shutters consists of a thermostat 25 of usual construction, arranged within the incubator casing, whose regulating rod 26 extends through the top of the incubator casing and is adjustably connected with a lever 27 as indicated at 28. This lever is pivoted on the top of the casing, and a counter weight 29 is adjustably mounted on the lever. The opposite end of the lever extends beyond the end of the incubator casing, and a link 30 connects the said end with the end of the uppermost of a pair of parallel levers 31—32. The lever 31 is pivoted intermediate its ends to the bottom of the casing, as indicated at 33, and the lever 32 is connected to the lever 31 at their inner ends by a link 34 and near their outer ends by a thermostat 35.

The link 19 before mentioned, is connected with the outer end of the lever 32, and the inner end of the said lever is weighted by a cup 36 of mercury. It will be evident that since the thermostat 35 is outside the casing and the thermostat 25 is inside the casing, the flame of the burner will be controlled by differences in temperature in both the inside and the outside. When the outside temperature rises or falls, the link 19 will operate the shutters to open or close the same, and the extent of movement of the operating arm 15 will depend upon the difference between the movements of the levers 27 and 32.

The cup 36 of mercury, is intended to counter-balance the parallel bars 31 and 32 in such manner that they will be acted upon by the thermostat 35. As is known, the more nearly the temperature of an incubator can be held at 103°, the greater the hatch, and the more hardy the chicks. The thermostat holds the internal temperature of the incubator at the same point, regardless of the opening or closing of the doors, while the thermostat 35 will operate the burner to compensate for changes in the outside temperature. The thermostats 25 and 35 are composed of flattened casings of brass of circular or elliptical form containing a volatile liquid which expands and contracts with heat and cold.

The wick 4 is raised and lowered in the ordinary manner. The heated air passing upward through the tapering flue 5, enters the pipe 6—6ª and passes through the incubator into the atmosphere. The atmospheric air is drawn in through the pipe 7—7ª and is discharged into the incubator. The casing 8—8ª is merely a jacket to assist in conserving the heat. Should, for instance the temperature rise to such a point that it is necessary to entirely shut off the flame, the pilot burner will still burn, and when the shutters are opened by a fall in temperature, the wick 4 will be ignited by the pilot burner. Thus the flame of the wick will be entirely controlled by the temperature through the shutters.

Figure 10:
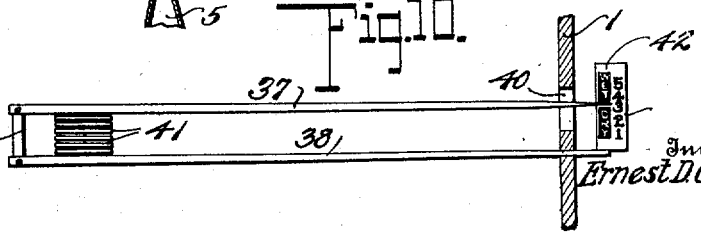
Fig. 10 is a diagrammatic view of a moisture indicating mechanism.

In Fig. 10 is shown a moisture indicating mechanism, the said mechanism comprising a pair of parallel bars 37 and 38 pivotally connected at one end by a link 39, and the outer ends of the said bars extend through the incubator wall, the bar 38 being fixed and the bar 37 moving in a slot 40 in the wall. Controlling mechanism 41 for the bar 37 is arranged between the bars near their inner ends for operating the bar 37 and the said controlling mechanism comprises a series of treated cardboard disks glued together and secured to and resting upon the end of the bar 38, and the bar 37 rests upon the upper end of the series of disks, and it will be evident that when the disks absorb moisture, the cylinder formed by the disks, will expand raising the bar 37. The outer end of the said bar is pointed, as an indicator, and coöperates with a scale 42 supported by the bar 38. This scale carries a series of numerals and legends "Wet" and "Dry." When the cylinder 41 absorbs moisture, the bar 37 will move toward the legend "Wet," while when the disk dries out the bar will move toward the legend "Dry," and the numerals 1 to 5 inclusive arranged successively, will indicate the relative amount of moisture.

What I claim is:

1. In an incubator, the combination with the casing, of a thermostat within the same, a lever mounted on the casing with which the thermostat is in operative coöperation to swing the lever, a pair of levers arranged below the casing, the uppermost lever being pivoted intermediate its ends to the casing, a link pivotally connecting the inner ends of the levers, a thermostat arranged between the levers near their outer ends, a link connecting the outer end of the uppermost lever with the first named lever, a burner and a connection between the outer end of the lowermost lever of the pair and the burner for controlling the said burner.

2. In an incubator, the combination with the casing, of a thermostat within the same, a lever operated thereby, a pair of superposed parallel levers suspended from the casing, the uppermost lever being connected to the first named lever at one end, a burner, a connection between the adjacent end of the lowermost lever and the burner for controlling said burner, and a thermostat between the parallel levers.

3. In an incubator, a main burner having at one end thereof a pilot burner, a pair of shutters movable toward and from the flame of the main burner and having a partition plate adapted to extend between the pilot burner and the main burner when the shutters are closed, an operating arm for simultaneously moving the shutters in opposite directions, and thermostats inside the incubator and outside the same, and connected with the said arm for permitting either thermostat to control the said arm.

4. In an incubator, a main burner having at one end thereof a pilot burner, a pair of shutters movable toward and from the flame of the main burner and having a partition plate adapted to extend between the pilot burner and the main burner when the shutters are closed, an operating arm for simultaneously moving the shutters in opposite directions, and a thermostat for controlling the said arm.

5. In an incubator, a main burner and a pilot burner for igniting the main burner, a pair of shutters movable toward and from the flame of the main burner for controlling the same, means for simultaneously moving the shutters adapted for connection with a thermostat, one of the shutters having means adjustable therewith for interposing between the pilot burner and the main burner when the shutters are closed.

6. In an incubator, a burner, a pair of oscillatory shutters arranged on opposite sides of the burner and movable simultaneously toward and away from the burner for regulating the flame thereof, the distal edges of the shutters being adapted to meet over the burner when moved to abutting position, whereby the flame may be extinguished, said shutters having a cut-away portion at corresponding corners of said distal edge portions thereof to provide a comparatively small pilot flame at one side edge of the burner.

7. In an incubator, a burner, an oscillatory shutter arranged on one side of the burner and movable toward and away from the latter, the distal edge portion of said shutter being extended inwardly toward the burner and adapted to overlie the same at a point in its inward movement whereby the flame of the burner may be extinguished, a portion of the inturned edge of said shutter being cut-away, thereby providing a pilot burner, and means in said cut-away portion of the shutters and transversely extending across the burner to be interposed between the pilot light and the remainder of the burner, said means being adjustably mounted on one of said shutters to vary the volume of said pilot light, for purposes set forth.

8. In an incubator, a thermostat disposed to be affected by the temperature within the incubator, a lever actuated by said thermostat, a pair of spaced operable levers, one of which is connected with said first named lever, a burner having connection with the other of said pair of levers for controlling the burner, and a thermostat between said pair of spaced levers and arranged to be affected by the temperature outside of the incubator.

9. In an incubator, a thermostat disposed to be affected by the temperature within the incubator, a lever actuated by said thermostat, a pair of superposed levers movable relative to each other, the uppermost of said pair of levers having operable connection with said first lever, a burner having operable connection with the lowermost of said pair of levers for controlling the burner, and a thermostat between the said pair of levers and arranged to be affected by temperature outside of the incubator, whereby the said pair of levers may be moved relatively to each other.

In witness whereof, I affix my signature.

ERNEST D. CHARTERS.